Figure 1:
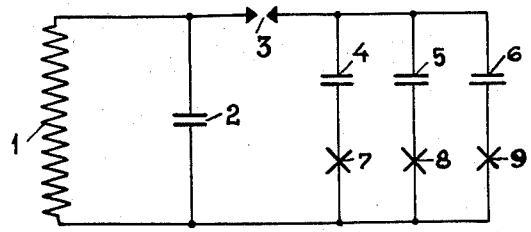

INVENTOR.
WYTZE BEYE SMITS
BY
Robert B Larson
ATTORNEY

United States Patent Office 2,925,533
Patented Feb. 16, 1960

2,925,533

IGNITION CIRCUIT FOR JET ENGINES AND THE LIKE

Wytze Beye Smits, Voorburg, Netherlands

Application June 17, 1954, Serial No. 437,445

2 Claims. (Cl. 315—210)

This invention relates to an ignition system, and more particularly to a system specifically designed for installation in a jet engine, gas turbine or oil burner, wherein there is more than one combustion chamber, and it is desired to provide each combustion chamber with an ignition device.

Heretofore, in jet engine ignition installations it has been customary that for nine combustion chambers there be provided only two spark plugs. Each of the combustion chambers is connected to adjacent chambers by means of ducts. The spark plugs initiate burning in the combustion chambers in which they are located and burning is started in the other combustion chambers by way of the connecting ducts or passageways.

The disadvantages in the prior art ignition systems described above are many and varied. For example, in the event that the burning fuel should be blown out by the high air velocity and when flying at high altitudes, it is extremely difficult to relight the fuel. This is due to the fact that ordinary high voltage spark plugs frequently fail to produce a spark under the environmental conditions present at high altitudes. It has been necessary, therefore, for a pilot of a jet aircraft to bring his plane to a lower altitude and to reduce air speed in the event that the burning fuel is blown out.

It is, of course, impossible to construct a jet engine with a high tension spark plug in each combustion chamber due to the exceedingly high voltages which would be required. Such high voltages would necessitate the use of cables of such weight as to render the ignition system entirely impractical.

Another problem involved in the use of present-day jet engines is that the ignited fuel within the combustion chambers frequently burns obliquely rather than in the center of the chamber. Such improper burning is caused if the fuel within an adjacent combustion chamber is not ignited whereby a lower pressure is created and the burning fuel of the adjacent chamber is drawn towards the connecting duct. When the fuel in a combustion chamber burns obliquely, the walls of the chamber are subjected to tremendous heat and the consequent difficulties are obvious.

The present invention overcomes all of the foregoing disadvantages by providing a novel circuit which utilizes low tension spark plugs. The spark plug used with this circuit is one such as disclosed in applicant's Patent No. 2,125,035, issued July 26, 1938, for Electric Ignition System and Sparking Plug for Internal Combustion Engines. The essential feature of such spark plugs is that they employ relatively low voltages and provide a spark which, in effect, creeps across the surface of the plug. This creeping discharge is attained by providing a semi-conductor between the electrodes of the plug. The advantages derived from this arrangement are numerous, one of the principal novel results being the obviation of cleaning the plugs. For purposes of the present invention, the spark plug described provides a spark which cannot be blown out since it does not rely upon the air as a conducting medium and therefore is not affected by variations in the atmospheric conditions.

By utilizing spark plugs which require relatively low voltages such as described above, it is possible to provide an ignition system for jet engines, gas turbines or oil burners in which the spark plug can be inserted in each combustion chamber. In jet engine installations providing a spark plug in each combustion chamber gives greater assurance of relighting blown out chambers. Furthermore, the connecting ducts between adjacent combustion chambers can be omitted altogether if desired, thereby overcoming the difficulties encountered with oblique burning which have been pointed out hereinbefore. According to the present invention, an ignition coil charges a condenser which discharges across the spark plugs and charges separate condensers for each plug. These separate ignition condensers also discharge across the spark plug so that each plug is fired twice for each charge of the principal condenser. According to one form of the invention, a spark gap is provided in the discharge path of the principal condenser. The provision of the spark gap assures that the maximum charge on the primary condenser is reached prior to discharge. According to another illustrated embodiment of the invention, separate spark gaps are provided for each spark plug.

A primary object of this invention is to provide an ignition circuit for jet engines and the like in which a spark plug is provided for each combustion chamber so that relighting blown out chambers may be more easily accomplished.

A further object of this invention is to provide an ignition system for jet aircraft and the like which employs a spark plug requiring relatively low voltages and which consistently produces a spark irrespective of atmospheric conditions.

Still another object of the present invention is the provision of an ignition system for jet aircraft and the like in which low tension spark plugs are utilized whereby an individual spark plug may be provided for each of the combustion chambers so that the connecting ducts previously provided between adjacent combustion chambers may be omitted.

Figure 2:
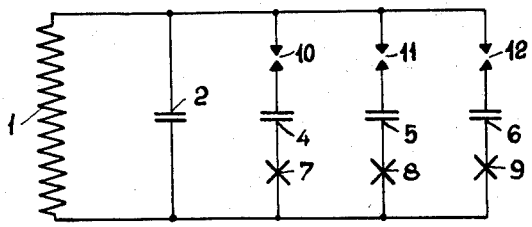

Other objects and many of the attendant advantages of this invention will become apparent in the light of this specification when considered in connection with the accompanying drawing wherein:

Fig. 1 is a circuit diagram of an ignition circuit embodying one form of the present invention; and Fig. 2 is a circuit diagram showing another embodiment of this invention.

Referring now to the drawing wherein like numerals illustrate like parts throughout the two views, there is shown at 1 an ignition coil which is fed by any alternating current supply or by a pulsating voltage having positive and negative values. Connected to this ignition coil is a main or primary condenser 2 which is charged by the ignition coil and which discharges across the spark gap 3 and spark plugs 7, 8 and 9 to charge condensers 4, 5 and 6. These condensers when charged will also discharge across the spark plugs. It can be thus seen that a spark is produced at the plugs 7, 8 and 9 when both charging and discharging the ignition condensers 4, 5 and 6. When using this invention with a jet engine having, for example, nine combustion chambers it is obvious that three of the presently described installations may be used.

Referring to Fig. 2, it can be seen that the circuit for each of the ignition condensers 4, 5 and 6 is provided with a separate spark gap as shown at 10, 11 and 12. It is obvious that under certain circumstances the primary condenser 2 can be omitted and the condensers 4, 5 and 6 may be directly charged by the ignition coil 1.

The presence of the spark gap in both embodiments assures that the charge on the primary or main condenser will reach its maximum value prior to discharge across the low tension spark plugs. The individual ignition condensers 4, 5 and 6 act as buffers in the circuit, thereby preventing the possibility that the condenser 2 might discharge through only one of the spark plugs 7, 8 and 9.

By utilizing low tension spark plugs such as previously described, it is possible by the novel circuit herein described to provide an ignition system for a jet aircraft which assures relighting of blown out combustion chambers under any atmospheric conditions.

Having thus described the invention it is apparent that numerous changes in design and construction of the same may be employed without departing from the essentials thereof. What is claimed as new and desired to be secured by Letters Patents is:

1. A low tension ignition circuit for jet engines, gas turbines and the like, comprising a charging circuit including impulse producing means, a main condenser connected in parallel with said impulse producing means, a plurality of discharge circuits, said discharge circuits being disposed in parallel with respect to each other and with said main condenser, each of said discharge circuits including a low tension surface discharge spark plug and an ignition condenser series connected, the main condenser being adapted to discharge to charge the ignition condensers and fire the spark plugs and said ignition condensers being adapted to subsequently discharge to said main condenser to fire the spark plugs again.

2. A low tension ignition circuit according to claim 1 wherein a spark gap is disposed in series between said charging circuit and said discharge circuits.

References Cited in the file of this patent

UNITED STATES PATENTS

| 416,635 | Lungen | Dec. 3, 1889 |
| 2,175,900 | Knight | Oct. 10, 1939 |
| 2,197,114 | Rabezzana | Apr. 16, 1940 |
| 2,427,247 | Wilkinson | Sept. 9, 1947 |
| 2,478,672 | Smits | Aug. 9, 1949 |
| 2,551,101 | Debenham et al. | May 1, 1951 |
| 2,557,909 | Cross | June 19, 1951 |
| 2,584,507 | Smits | Feb. 5, 1952 |
| 2,779,898 | Smits | Jan. 29, 1957 |

FOREIGN PATENTS

| 510,302 | Belgium | Apr. 15, 1952 |

UNITED STATES PATENT OFFICE

CERTIFICATE OF CORRECTION

Patent No. 2,925,533 February 16, 1960

Wytze Beye Smits

It is hereby certified that error appears in the above numbered patent requiring correction and that the said Letters Patent should read as corrected below.

In the grant, lines 1, 2, and 3, for "Wytze Beye Smits, of Voorburg, Netherlands," read -- Wytze Beye Smits, of Voorburg, Netherlands, assignor to Smitsvonk N. V., of Leidschendam, Netherlands, a research Laboratory, --; line 12, for "Wytze Beye Smits, his heirs" read -- Smitsvonk N. V., its successors --; in the heading to the printed specification, line 4, for "Wytze Beye Smits, Voorburg, Netherlands" read -- Wytze Beye Smits, Voorburg, Netherlands, assignor to Smitsvonk N. V., Leidschendam, Netherlands, a research Laboratory --.

Signed and sealed this 26th day of July 1960.

(SEAL)
Attest:

KARL H. AXLINE
Attesting Officer

ROBERT C. WATSON
Commissioner of Patents